Figure 1:
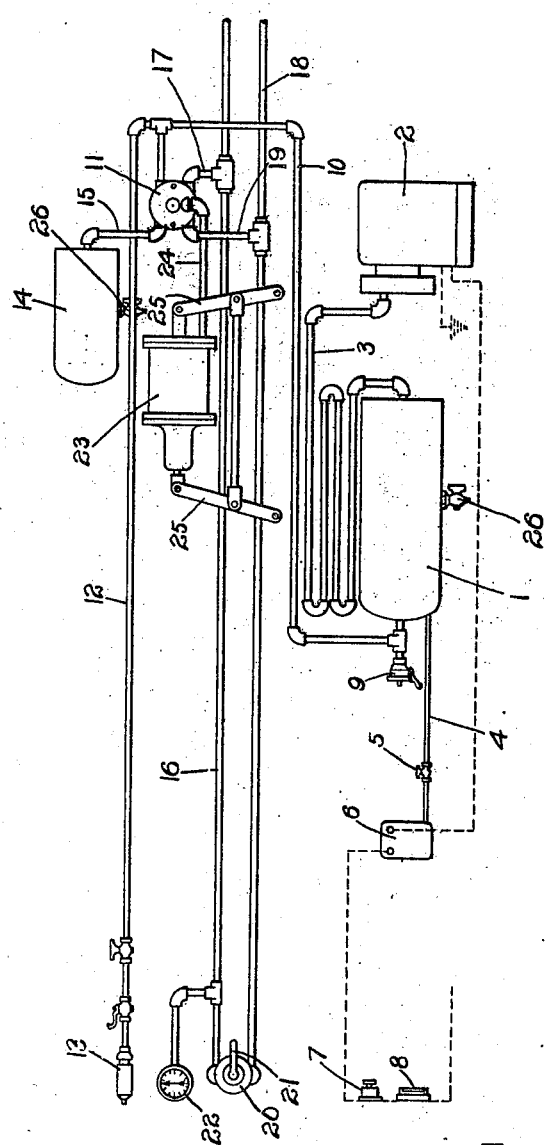

B. S. AIKMAN.
AUTOMATIC VALVE.
APPLICATION FILED MAR. 7, 1910.

1,026,620.

Patented May 14, 1912.
5 SHEETS—SHEET 1.

Witnesses
George E. Higham.
Frank J. Thelen

Inventor
Burton S. Aikman.
By Brown & Williams
Attorneys

B. S. AIKMAN.
AUTOMATIC VALVE.
APPLICATION FILED MAR. 7, 1910.

1,026,620.

Patented May 14, 1912.
5 SHEETS—SHEET 2.

Witnesses
George E. Higham.
Frank J. Phelan

Inventor
Burton S. Aikman
By Brown & Williams
Attorneys

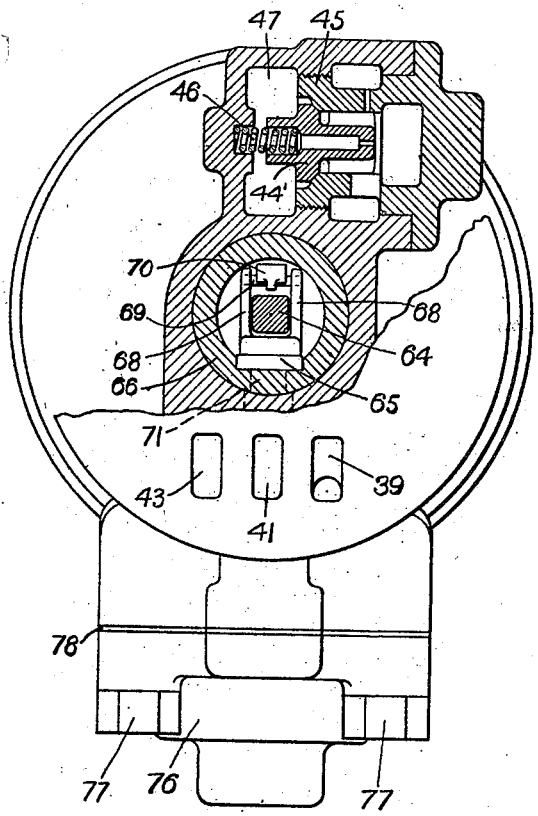

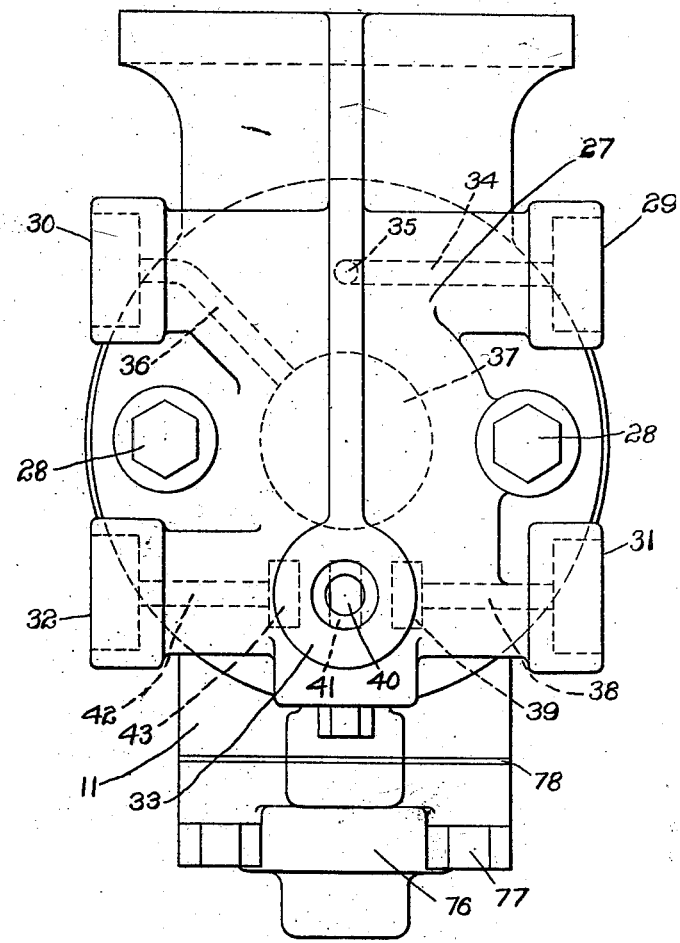

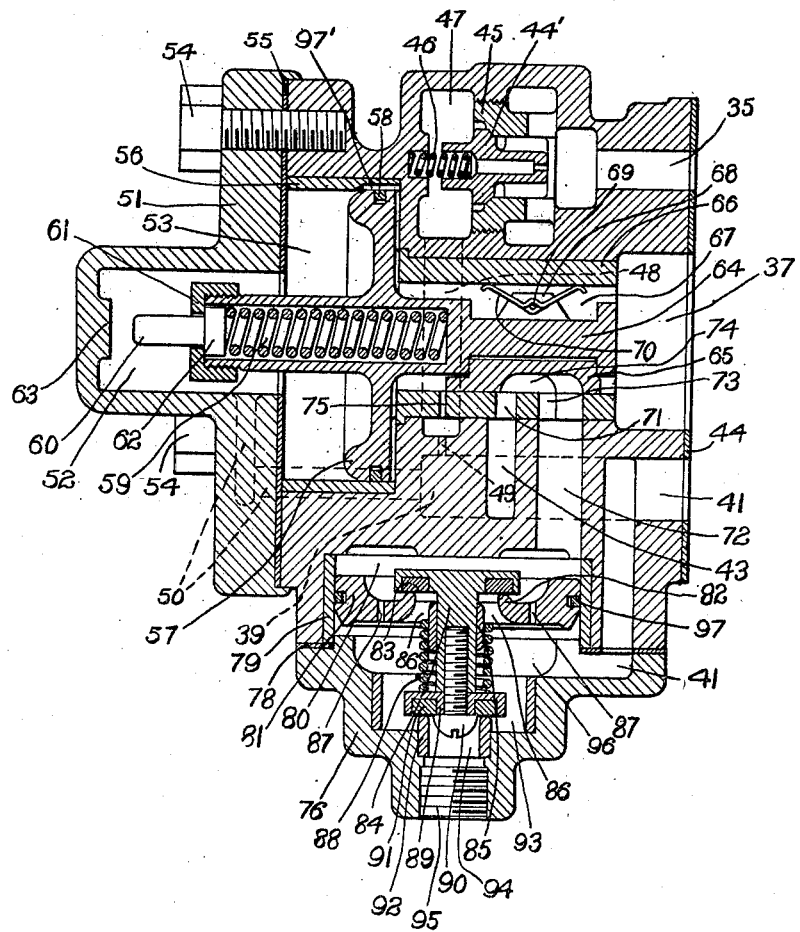

UNITED STATES PATENT OFFICE.

BURTON S. AIKMAN, OF CHICAGO, ILLINOIS, ASSIGNOR TO NATIONAL BRAKE & ELECTRIC CO., OF MILWAUKEE, WISCONSIN, A CORPORATION OF WISCONSIN.

AUTOMATIC VALVE.

1,026,620. Specification of Letters Patent. Patented May 14, 1912.

Application filed March 7, 1910. Serial No. 547,887.

*To all whom it may concern:*

Be it known that I, BURTON S. AIKMAN, a citizen of the United States, residing at Chicago, in the county of Cook and State of Illinois, have invented a certain new and useful Improvement in Automatic Valves, of which the following is a full, clear, concise, and exact description, reference being had to the accompanying drawings, forming a part of this specification.

My invention relates to automatic air valves, and has special reference to the form of valve which is used in connection with air brake systems used on electric and other trains.

It is well known that in the development of air brake systems the earliest form which was employed was the so-called "straight air" system, where the air passed directly from the brake pipe to the brake cylinder, thus serving to apply the brakes. On the other hand, when the brakes were to be released, the air in the brake pipe was exhausted through the engineer's valve, and simultaneous exhaust from the brake cylinders took place, thus allowing a spring within the brake cylinder to become effective in causing the release of the brakes. In this system there were several disadvantages. In the first place, inasmuch as the brake pipe was supplied with air from the main reservoir only through the engineer's valve, it is clear that the increased pressure would be effective at the front end of the train prior to the rear end, thus causing an application of the brakes on the forward cars in advance of the rear cars. The result of this was that if a quick application of the brakes was made, so that the speed of the front cars was rapidly decreased, the rear cars on which the brakes had not yet been applied would bump against the front cars, thus causing considerable damage. Conversely, inasmuch as the exhaust took place through the engineer's valve, the brakes were released from the front end of the train in advance of the rear end, and by application of power from the locomotive, the train was very apt to be pulled apart. In view of these difficulties, the automatic air brake system was developed, in which an auxiliary reservoir is employed, this reservoir being charged by air from the brake pipe. When the pressure in the brake pipe was lowered, a piston in the automatic valve on each car was moved to such position that connection was established between the auxiliary reservoir and the brake cylinder, thus causing air to flow from the auxiliary reservoir to the brake cylinder, and applying the brakes. One of the greatest advantages of this system is that if a car becomes separated from the train, or if the brake pipe is injured so that air is exhausted from it, the piston of the automatic valve is moved so that air flows from the auxiliary reservoir to the brake cylinder, and the brakes are entirely automatically applied. The lack of such an automatic application is one of the serious disadvantages of the straight air system.

In many cases where but two or three cars are used in a train, the use of straight air is satisfactory provided the applications and releases of the brakes are not made too rapidly. If, however, a rapid application or release is desired, the disadvantage of the straight air system, in that the application or release takes place on the front cars of the train more rapidly than on the rear cars, immediately becomes apparent. The automatic valve of my invention combines the simplicity of the straight air system with the above-mentioned advantages of the automatic system.

When it is desired to make a gradual or slight application of the brakes, in my improved system air passes directly from the brake pipe into a so-called cylinder pipe which is connected with all of the brake cylinders on the train through the automatic valves which are located on each car. When the decrease in pressure in the brake pipe, however, exceeds a certain predetermined amount, the piston within the valve is automatically moved by the excess of pressure in the auxiliary reservoir over that in the brake pipe, so that connection is directly established between the auxiliary reservoir and the brake cylinder, thereby increasing the force of the application of the brakes. Similarly, when it is desired to release the brakes, if this release is to be gradual, the air from the cylinder pipe is exhausted to atmosphere through the engineer's valve. If, however, the opening in the engineer's valve by which the cylinder pipe is connected to the atmosphere is larger than the sum of the areas of restricted openings affording communication between the brake cylinders and the cylinder pipe, a second piston within the automatic valve is moved so that a local connection is made on each car between the brake cylinder and atmosphere, thereby causing a quick release of the brakes.

One of the important features of my invention consists in a direct connection between the main reservoir and the brake pipe. This connection is in the form of a restricted opening, and serves merely to keep the pressure in the brake pipe equal to that in the main reservoir unless a rapid and thereby automatic application of the brakes is made. In this case, inasmuch as the air travels from the brake pipe to the cylinder pipe more rapidly than it can pass from the main reservoir to the brake pipe through the restricted opening in the automatic valve, the piston, as explained above, will be moved to establish connection between the auxiliary reservoir and the brake cylinder. As soon, however, as the pressure in the brake pipe is again raised to an amount slightly in excess of the pressure in the auxiliary reservoir, the piston will again be returned to its normal position, and the auxiliary reservoir will be charged regardless of the position in which the engineer's valve is placed. This is a feature of great importance, inasmuch as the system is in proper condition for a second automatic application almost immediately after one has already been made. A second important advantage is the high brake cylinder pressure obtained in emergency application of the brakes, inasmuch as in this case the full pressure of the auxiliary reservoir is obtained, and also, added to this, the pressure of the brake pipe. A third advantage is the direct connection through the cylinder pipe of the brake cylinders on the train, thereby insuring an equal application of the brakes on the various cars. These and other advantages of my invention will be more apparent by reference to the accompanying drawings, in which—

Figure 2:
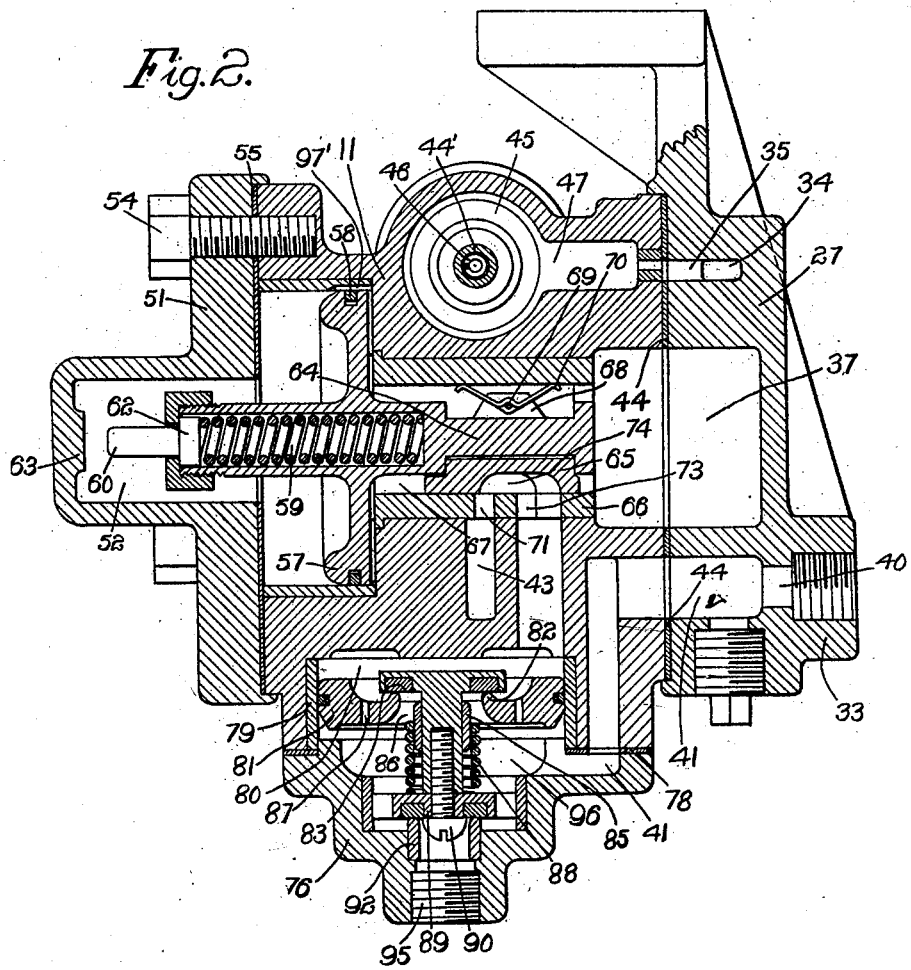

Figure 1 is a diagrammatic view showing the relation of the automatic valve of this application to the system as a whole. Fig. 2 is a vertical longitudinal sectional view of the automatic valve. Fig. 3 is an end elevation of the automatic valve with the bracket shown in Fig. 2 removed, and part of the valve broken away in order to show the valve controlling the air from the main reservoir and the slide valve in section. Fig. 4 is an end elevation of the bracket to which the automatic valve is attached. Fig. 5 is a diagrammatic vertical longitudinal section through the automatic valve, the various parts being somewhat distorted in order to show the controlling valve and passages in a single plane.

In order that the description of the automatic valve which constitutes the subject matter of my present invention may be thoroughly understood, I will first describe the general operation of the system in connection with which this automatic valve is used. As shown in Fig. 1, 1 is the main reservoir, which is supplied with air from the compressor 2, this air passing from the compressor to the main reservoir 1 through the radiating pipe 3. A pipe 4, provided with a stop-cock, 5, communicates with the governor 6. This governor controls the amount of current which flows to the operating mechanism of the compressor 2. When the pressure in the main reservoir 1 is at a minimum, the full strength of the current is allowed to flow through the governor 6 to the actuating mechanism of the compressor 2, whereas if the pressure in the main reservoir 1 reaches a predetermined maximum, this pressure, communicated to the governor 6 through the pipe 4, prevents the passage of further current to the actuating mechanism of the compressor, and the pressure in the main reservoir 1 is not further increased.

Located in a position to be under the direct control of the engineer or motorman, are the switch 7 and the fuse 8, which are in the electric circuit which controls the actuating mechanism of the compressor 2.

In connection with the main reservoir 1, is provided the safety valve 9, by means of which the pressure is prevented from exceeding a predetermined maximum. The pipe 10 leads from the main reservoir 1 to the automatic valve 11. In some cases it is desired to use an air-controlled whistle or sander, and in this case the pipe 12 is provided in direct communication with pipe 10, this pipe 12 leading to the whistle 13 or other air-controlled device.

The auxiliary reservoir 14 communicates with the automatic valve 11 through pipe 15. The relations of the various connections with the automatic valve will be described in detail hereafter. Passing through the entire length of the train is the break pipe 16 which communicates through pipe 17 with the automatic valve 11. The cylinder pipe 18 also passes through the entire length of the train and communicates with the automatic valve 11 through the pipe 19. Both the brake pipe 16 and the cylinder pipe 18 pass to the engineer's valve 20, which is controlled by means of the handle 21. The gage 22, in suitable position to be under the observation of the engineer, is connected with brake pipes 16 in order to indicate the pressure in the same. By means of the engineer's valve 20, communication is established between the brake pipe 16 and the cylinder pipe 18, and also between the cylinder pipe 18 and the atmosphere.

The brake cylinder 23 is connected with the automatic valve 11 by means of the pipe 24. According to the well-known system, a piston is provided within the brake cylinder, and when the pressure of air is increased, this piston is moved against the tension of a spring within the brake cylinder, and through the piston stem operates the levers 25, which are suitably connected with the brake shoes, and serve to set the brakes. When the pressure of air is released from the brake cylinder, the spring within the cylinder becomes effective and returns the piston to its normal position, thereby moving the levers 25 to release the brakes.

It often happens that the air which is compressed contains a considerable percentage of moisture, which condenses either in the main reservoir 1 or the auxiliary reservoir 14. In order to drain this condensed moisture, stop-cocks 26 are provided in connection with these reservoirs.

It will be understood that in the case of a normal train there is one main reservoir and compressor, whereas there is an auxiliary reservoir, automatic valve and brake cylinder on each car.

The automatic valve of the present invention is preferably of the so-called "pipeless" type; that is, the valve has ports or passages which register directly with corresponding ports or passages in a bracket, the piping being connected with this bracket. Suitable gaskets are provided between the automatic valve itself and the bracket, and it is unnecessary, when removing the valve, to disturb the piping in any way, the automatic valve being removed by the simple operation of first removing the bolts by means of which the automatic valve is attached to the bracket, and then simply separating the valve from the bracket. The employment of such a "pipeless" valve is very useful, on account of the facility of making repairs. As shown in Fig. 4, the automatic valve 11 is fastened to the bracket 27 by means of the bolts 28, 28. To the bracket 27 are attached the various pipes which have been described in connection with Fig. 1, and which, through the bracket 27, are in direct connection with the automatic valve 11. The bracket 27 is provided with a number of bosses, through which are formed suitable passages, as will be explained hereafter, and into which the ends of the various pipes are adapted to be screwed. The boss 29 receives the pipe 10, which communicates with the main reservoir 1. The boss 30 receives the end of pipe 15, which communicates with the auxiliary reservoir 14. The boss 31 receives the end of pipe 17, which communicates with brake pipe 16. Boss 32 receives the end of pipe 19, which communicates with cylinder pipe 18. Boss 33 receives the end of pipe 24, which leads to the brake cylinder.

Leading through the boss 29 is the passage 34, which, as shown in Figs. 2 and 4, communicates with passage 35 passing toward the automatic valve in a direction at an angle of ninety degrees from passage 34. Passage 36 leads through boss 30 and communicates with cavity 37 within the bracket 27. Passage 38 leads through boss 31 into passage 39. Passage 40 passes through boss 33 and communicates with passage 41. Passage 42 leads through boss 32, communicating with passage 43.

The automatic valve 11, as clearly shown in Fig. 2, fits against the bracket 27, leakage being prevented by means of the gasket 44. Passages 35, 39, 41 and 43, which we have described in connection with bracket 27 continue into the automatic valve 11, and the cavity 37 within the bracket 27 registers with a similar cavity within the automatic valve 11, thereby forming a single large cavity, part of which lies within the bracket 27 and part within the automatic valve 11.

As most clearly shown in Fig. 5, the passage 35 in the automatic valve 11 leads to the main reservoir valve 44', which is normally held against its seat in the bushing 45 by means of the spring 46. Communicating with passage 35 when the valve 44' is unseated, is the cavity 47, with which is connected the passage 48. A choke port 49 leads from passage 48 to passage 39, which, as explained above, is in communication through bracket 27 with the brake pipe. Forming a continuation of passage 39 is the passage 50, which passes through the member 51 of the automatic valve 11 into the chamber 52. Chamber 52 in the member 51 communicates directly with chamber 53 within the main portion of the automatic valve. The portion 51 of the automatic valve is held in position by means of bolts 54, an air-tight connection being formed with the main portion of the valve by means of the gasket 55. Within the chamber 53 is the bushing 56, which is adapted to coöperate with piston 57, which is provided with the packing ring 58, thereby forming a tight seal between bushing 56 and the piston 57. Within the piston stem is the emergency spring 59, one end of which has its bearing against the end of the cavity within the piston stem, and the other end of which has its bearing against the pin 60, this pin being held in position by means of the cap 61 which is screwed onto the end of the piston stem, the head 62 of the pin abutting against the cap 61. When the piston 57 is moved to the left, the end of pin 60 engages the projection 63 of the member 51 for the purpose which will be described hereafter.

As shown in Figs. 2 and 5, the piston stem extends to the right as well as the left, forming the portion 64. This portion is suitably formed, as shown, to engage the slide valve 65, which operates on the bushing 66, within which is the chamber 67. As best shown in Fig. 3, the slide valve has two lateral extensions 68, 68, between which is placed the pin 69 holding the spring 70, which engages the upper part of bushing 66, thereby keeping the slide valve 65 firmly seated against the lower portion of the bushing 66.

As shown in Fig. 3, passage 43 passes through the automatic valve 11 in a different vertical plane from passage 41 leading to the brake cylinder. Within the main portion of the valve, passage 43 turns and communicates with port 71 in the bushing 66. Passage 72, within the automatic valve communicates with port 73 in the bushing 66. A cavity 74 within the slide valve 65 affords communication, when the slide valve is in its normal position, as shown in Figs. 2 and 5, between the ports 71 and 73. A restricted port 75 within the bushing 66 affords communication between passage 48 and chamber 67 within the bushing 66, this port being covered by slide valve 65 when the piston 57 is moved to the left.

The portion 76 of the automatic valve is made separate from the main portion which contains the piston and slide valve mechanism, being connected to the main portion by any suitable means, as, for example, bolts 77, a tight joint being afforded by means of gasket 78. A bushing 79 is placed within the main casing of the automatic valve, forming therein the chamber 80. Adapted to operate within the bushing 79 is the piston 81, which is in the form of a ring having a projecting lip 82, which is adapted to form a tight connection against the annular seat 83 of the valve 84. A collar 85, the inside of which forms a bearing for the valve stem of valve 84, is made integral with the piston 81, being attached to the peripheral portion of the piston by means of the connecting members 86. Restricted ports 87 pass through the piston 81, affording communication between the portions of chamber 80 on the opposite sides of the piston 81. A spring 88 incloses the collar member 85, having a bearing on one end against the connecting members 86, and on the other end against the annular member 89 which is fastened to the valve 84 by the screw 90. Packing 91 is provided within the annular member 89, and when seated against valve bushing 92 cuts off communication between chamber 93 and passage 94 leading to the exhaust opening 95. Between chambers 80 and 93 is formed the chamber 96. Communicating with chamber 96 is passage 41, which, as explained above, communicates through bracket 27 with the brake cylinder. In a suitable groove in the piston 81 is the packing ring 97 which forms a tight connection between the piston 81 and the bushing 79.

Having thus described the construction of the automatic valve of my invention, the operation of the same may now be readily understood.

Air from the main reservoir 1 passes through pipe 10 and then through passage 34 of the boss 29 into the passage 35. Unless the pressure of air in chamber 47 is approximately equal to that in the main reservoir, the excess pressure of air in passage 35 unseats valve 44', and air from the main reservoir passes into the chamber 47, and then into passage 48. From this point the air passes through the choke port 49 into the passage 39, thus gradually raising the pressure in the brake pipe, which, as explained above, communicates with passage 39, until the pressure in the brake pipe equals the pressure in the main reservoir. The air also passes through passage 50 into chambers 52 and 53, thereby causing the piston 57 to be moved to the right into the position shown in Figs. 2 and 5. At the same time, when the piston is in this position, air passes through the port 97' into the chamber 67, and also from passage 48 into the same chamber through the restricted port 75. From chamber 67 the air passes into cavity 37, and thence through passage 36 and pipe 15 to the auxiliary reservoir 14, so that it will be evident that the pressure in the main reservoir 1, the brake pipe 16 and the auxiliary reservoir 14 becomes equalized. Now let us suppose that it is desired to make an application of the brakes. The handle 21 of the engineer's valve 20 is moved to the right, thereby establishing communication between the brake pipe 16 and the cylinder pipe 18. It is evident that air will now flow from brake pipe 16 into the cylinder pipe 18, then through pipe 19 into passage 42, then into passage 43, next through port 71, cavity 74 in the slide valve 65, and port 73 into passage 72. From passage 72 the air goes into chamber 80, then through restricted ports 87 into chamber 96, and then through passage 41 into passage 40, thence through pipe 24 to the brake cylinder, thereby applying the brakes. When an application is made in this way it will be apparent that no air flows from the auxiliary reservoir to the brake cylinder, the air passing directly from the main reservoir 1 through the brake pipe into the cylinder pipe, and then through the automatic valve 11 into the brake cylinder. In order to make application of the brakes in this manner it is necessary that the area of the connection which is established between the brake pipe and the cylinder pipe should be less than the area of the restricted port 49. By means of this condition it will be clear that the air in the brake pipe will be replenished from the main reservoir faster than it passes from the brake pipe into the cylinder pipe. In this way the pressure of brake pipe air in chamber 53 is kept constant, and piston 57 remains in its normal charging position. Let us now assume that the handle 21 has been moved to the right so that the area of the port establishing communication between the brake pipe 16 and cylinder pipe 18 is in excess of the area of choke port 49. Air will now flow from the brake pipe into the cylinder pipe at a rate faster than it can be replenished from the main reservoir through choke port 49. The result of this will be that the pressure in chamber 53 will be diminished and the pressure of air in the auxiliary reservoir 14 acting through pipe 15, passage 36, cavity 37 and chamber 67, will move the piston 57 to the left, thereby cutting off communication between chambers 53 and 67 through port 97', and covering port 75 by means of slide valve 65, thus also breaking communication between passage 48 and chamber 67. The piston 57 will move to the left until the end of pin 60 strikes the projection 63, when the emergency spring 59 then exerts its pressure to prevent the further movement of piston 57. Meanwhile slide valve 65 has been moved to such a position that direct communication is established between port 73 and chamber 67 and cavity 37, and air from the auxiliary reservoir will flow from chamber 67 through port 73 into passage 72, thence through the same path which we described above, into the brake cylinder, thus applying the brakes by means of pressure from the auxiliary reservoir. When this automatic method of applying the brakes is used, the movement of slide valve 65 to the left, and thereby the size of the opening which is formed between chamber 67 and passage 72 will be directly proportional to the size of the opening which is formed between the brake pipe and cylinder pipe. By movement of the slide valve 65 to the left, communication between ports 71 and 73, and therefore between the cylinder pipe 18 and the brake cylinder, is broken. The slide valve remains in service position until the handle 21 of the engineer's valve is either moved back to its central position or its release position, which will be explained hereafter. If it is moved to its central position, communication between the brake pipe 16 and the cylinder pipe is broken, and the pressure in the brake pipe will increase, thereby increasing the pressure in chamber 53 and moving the piston 57 back to its normal position, and air will then flow through feed port 97' and restricted port 75 into the auxiliary reservoir, the pressure of which will then be again increased to normal. The brakes will not be released when the brake handle is in its central or so-called "lap" position, for the reason that the cylinder pipe is not connected with the exhaust pipe at the engineer's valve. It will be clear that the advantage of recharging the auxiliary reservoir in this way while the brakes are still applied, is of very great utility.

When it is desired to make an emergency application of the brakes, the brake valve handle is moved to its extreme position at the right, thereby forming a large opening between the brake pipe 16 and the cylinder pipe 18, and causing a very rapid reduction in pressure in the chamber 53. The piston 57 is now moved to its extreme position to the left, compressing the emergency spring 59, and the full area of port 73 is uncovered, allowing the rapid flow of air from the auxiliary reservoir into passage 72. On account of this rapid rush of air, the ports 87, 87 are not of sufficient area to allow the pressure to be immediately transferred to the brake cylinder, and the result is that the piston 81 is moved downwardly, thereby compressing the spring 88, the lip portion 82 of the piston being unseated from its seat 83. The air then flows rapidly through chamber 80 into chamber 96, and thence to the brake cylinder through the same path which has been described above. After equalization of pressure between the auxiliary reservoir 14 and the brake cylinder 22, the pressure in the brake pipe 16 and cylinder pipe 18 will be again raised by the passage of air from the main reservoir 1 through the choke port 49. The air cannot, however, pass from the cylinder pipe into the brake cylinder on account of the fact that communication between ports 71 and 73 is interrupted by the position of the slide valve 65. When the pressure in brake pipe 16 and connected cylinder pipe 18 is slightly in excess of the pressure in the auxiliary reservoir 14, the brake pipe pressure in chamber 53 will become effective in moving the piston 57 back into its normal position, as shown in Figs. 2 and 5, thereby establishing connection between ports 71 and 73, and allowing air to flow from the cylinder pipe into the brake cylinder, and so giving an increased cylinder pressure.

When a train is broken in two, or any accident happens to the brake pipe, causing the same to exhaust direct to the atmosphere instead of into the cylinder pipe, the piston 57 will similarly be moved to its extreme position at the left, and air will flow from the auxiliary reservoir to the brake cylinder, thereby applying the brakes. In this case the piston 57 will not resume its normal position inasmuch as there will be no opportunity to increase the pressure in the brake pipe, and on account of the fact that communication is thus interrupted between ports 71 and 73, the brake cylinder will not be exhausted even if the cylinder pipe were broken.

When it is desired to release the brakes, the handle 21 of the engineer's valve 20 is moved to the left, establishing communication between the cylinder pipe and atmosphere through an exhaust pipe of the engineer's valve. Provided the area of the connection between the cylinder pipe and atmosphere is not in excess of the combined area of the ports 87, in the piston 81, the air from the brake cylinder will flow through pipe 24 to passage 40, then through passage 41 into chamber 96, then through ports 87 into chamber 80, next into passage 72, then through port 73, cavity 74, port 71 into passage 43, thence through passage 42 into cylinder pipe 18, and then through the engineer's valve into the exhaust pipe connected with atmosphere. In this way a slow release will be made according to the so-called "straight-air" system, all of the air from the brake cylinders being exhausted at the engineer's valve. If, however, the brake valve handle 21 is moved farther to the left so that connection between the cylinder pipe and atmosphere has a greater area than the combined area of ports 87, the air will be exhausted from the cylinder pipe more rapidly than it can be supplied through ports 87, and the piston 81 will be moved upwardly, carrying with it the valve 84, and the packing 91 in the member 89 will be unseated from the annular member 92, thereby allowing the air from passage 41 to flow through chamber 96 into chamber 93, and thence through passages 94 and 95 to the atmosphere, thus causing a local exhaust on each car, and causing a quick or automatic release of the brakes. It will be noticed that in both the "straight-air" and automatic release, the pressure of air in the brake pipe is entirely unaffected, and no movement of the piston 57 takes place as a result of the release of the brakes, the latter piston normally remaining in its charging position, thereby causing the auxiliary reservoir to be replenished from the brake pipe and the main reservoir. This point is one of great importance, inasmuch as the release of the brakes is made entirely independent of the action of the main piston 57, and even were this piston to become stuck so that it could not be moved within the bushing 56, the brakes could still be readily released. This is a point of great superiority over automatic valves of the prior art, where it has been necessary to release the brakes by increasing the pressure in the brake pipe, thereby moving the main piston to its release position and establishing connection between the brake cylinder and atmosphere through appropriate ports in the slide valve.

From the above description it appears that for the valve arrangement indicated in Fig. 5 the port 75 serves to charge the auxiliary reservoirs directly from the main reservoir instead of from the brake pipe. It sometimes happens that where there are several cars in a train an unequal charge of the auxiliary reservoirs occurs in using the system outlined above, as a result of which the brakes may be set on the car having the overcharged auxiliary reservoir. This condition may be readily avoided by using a construction of valve as indicated in Fig. 2, which is similar in all respects with that shown in Fig. 5, except that the port 75 is omitted, and, as a result, the auxiliary reservoirs are charged directly from the brake pipe. The latter arrangement prevents the overcharged condition of the auxiliary reservoirs just referred to, and thus is found to afford better operation under certain conditions than the arrangement in which the port 75 is used.

Many changes can be made in the detailed construction of the automatic valve which I have described above, without departing from the spirit of my invention.

What I claim is:

1. In a fluid pressure brake system, the combination of a main reservoir, an auxiliary reservoir, a brake cylinder, means for connecting said main reservoir with said brake cylinder, and means for automatically connecting the auxiliary reservoir with the brake cylinder when the flow of fluid to the brake cylinder exceeds a predetermined rate.

2. In a fluid pressure brake system, the combination of a main reservoir, an auxiliary reservoir, a brake cylinder, means for connecting said main reservoir with said brake cylinder, means for restricting the passage of fluid from said main reservoir to said brake cylinder, and means for automatically connecting the auxiliary reservoir with the brake cylinder when the flow of fluid to the brake cylinder exceeds a predetermined rate.

3. In a fluid pressure brake system, the combination of a main reservoir, an auxiliary reservoir, a brake cylinder, a brake pipe, means connecting said main reservoir with said brake pipe, means connecting said brake pipe with said brake cylinder, means for restricting the passage of fluid from the brake pipe to the brake cylinder, and means for automatically connecting the auxiliary reservoir with the brake cylinder when the passage of fluid from the brake pipe to the brake cylinder exceeds a predetermined rate.

4. In a fluid pressure brake system, the combination of a main reservoir, a brake cylinder, an auxiliary reservoir, and an automatic valve connected with the main reservoir, said valve adapted to normally connect the main reservoir with the brake cylinder, and to connect the auxiliary reservoir with the brake cylinder when the flow of fluid from the main reservoir to the brake cylinder exceeds a predetermined rate.

5. In a fluid pressure brake system, the combination of a main reservoir, a brake cylinder, a brake pipe, an auxiliary reservoir, and an automatic valve connected directly and independently with the main reservoir, brake cylinder, brake pipe and auxiliary reservoir, adapted to automatically establish connection between the auxiliary reservoir and the brake cylinder when the pressure in the brake pipe becomes lower than the pressure in the auxiliary reservoir.

6. In a fluid pressure brake system, the combination of a main reservoir, an auxiliary reservoir, a brake cylinder, a brake pipe, means connecting said main reservoir with said brake pipe, means connecting said brake pipe with said brake cylinder, means for varying the size of the opening connecting the brake pipe with the brake cylinder, and means for automatically connecting the auxiliary reservoir with the brake cylinder when the size of the opening connecting the brake pipe with the brake cylinder exceeds the size of the opening in the means connecting the main reservoir with the brake pipe.

7. In a fluid pressure brake system, the combination of a main reservoir, an auxiliary reservoir, a brake cylinder, a brake pipe, means for constantly connecting said main reservoir with said brake pipe, said connecting means having a restricted port therein, means connecting said brake pipe with said brake cylinder, means for varying the cross-section of the opening through which the fluid passes from the brake pipe to the brake cylinder, and means for automatically establishing connection between the auxiliary reservoir and the brake cylinder when the cross-sectional area of the opening connecting the brake pipe with the brake cylinder exceeds the cross-sectional area of the restricted port connecting the main reservoir with the brake pipe.

8. An automatic valve for fluid pressure brake systems comprising a main casing, a movable piston within said casing, a passage adapted for connection with the main reservoir, a passage adapted for connection with the brake pipe, a restricted port between the main reservoir passage and the brake pipe passage, said brake pipe passage in communication with the portion of the piston chamber lying on one side of the piston, a passage normally connected with the brake cylinder, a chamber adapted to be connected to the auxiliary reservoir and in communication with that portion of the piston chamber on the opposite side of the piston, a passage adapted to afford connection between the auxiliary reservoir and the brake cylinder, and means controlled by the piston for normally interrupting communication between the auxiliary reservoir and brake cylinder and establishing communication between the cylinder pipe and brake cylinder, movement of the piston serving to establish communication between the auxiliary reservoir and the brake cylinder and to interrupt communication between the cylinder pipe and brake cylinder.

9. An automatic valve for fluid pressure brake systems comprising a main casing, a passage in said casing adapted for connection with main reservoir through a restricted opening, a passage adapted for connection with the brake pipe and communicating with the main reservoir passage, a passage adapted for connection with the auxiliary reservoir, a passage adapted for connection with the brake cylinder, a passage adapted for connection with the cylinder pipe, and automatically controlled means for selectively establishing communication between the cylinder pipe and brake cylinder or between the auxiliary reservoir and brake cylinder.

10. An automatic valve for fluid pressure brake systems comprising a main casing, a passage in said casing adapted for connection with the main reservoir, an equalizing check valve in said passage, a passage adapted for connection with the brake pipe and communicating with the main reservoir passage, a passage adapted for connection with the auxiliary reservoir, a passage adapted for connection with the brake cylinder, a passage adapted for connection with the cylinder pipe, and automatically controlled means for selectively establishing communication between the cylinder pipe and the brake cylinder or between the auxiliary reservoir and brake cylinder.

11. An automatic valve for fluid pressure brake systems comprising a main casing, a passage in said casing adapted for connection with the main reservoir, an equalizing check valve in said passage, a passage adapted for connection with the brake pipe and communicating with the main reservoir passage, a passage adapted for connection with the auxiliary reservoir, a passage adapted for connection with the brake cylinder, a passage adapted for connection with the cylinder pipe, and an automatically controlled slide valve for selectively establishing connection between the cylinder pipe and brake cylinder or between the auxiliary reservoir and brake cylinder.

12. An automatic valve for fluid pressure brake systems comprising a main casing, a passage in said casing adapted for connection with the main reservoir, an equalizing check valve in said passage, a passage adapted for connection with the brake pipe and communicating with the main reservoir passage, a passage adapted for connection with the auxiliary reservoir, a passage adapted for connection with the brake cylinder, a passage adapted for connection with the cylinder pipe, a piston controlled by the relative pressure of fluid in the brake pipe and auxiliary reservoir, and a slide valve operated by said piston, said slide valve being automatically controlled and being adapted to selectively establish communication between said cylinder pipe and said brake cylinder or between the auxiliary reservoir and the brake cylinder according to the relative pressure of fluid in the brake pipe and auxiliary reservoir.

In witness whereof, I hereunto subscribe my name this 4th day of March, A. D. 1910.

BURTON S. AIKMAN.

Witnesses:
ALBERT C. BELL,
ROBERT F. BRACKE,